United States Patent
Vogt (10) Patent No.: US 6,435,169 B1
(45) Date of Patent: Aug. 20, 2002

(54) INTEGRATED MOTOR AND CONTROLLER FOR TURBOCHARGERS, EGR VALVES AND THE LIKE

(75) Inventor: Carl Randall Vogt, Raleigh, NC (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/528,105

(22) Filed: Mar. 17, 2000

(51) Int. Cl.[7] .......................... F02M 25/07; F16K 31/04
(52) U.S. Cl. .............................. 123/568.23; 251/129.11; 60/602
(58) Field of Search .................. 60/602; 251/129.11; 123/568.21, 568.23, 568.24, 568.11

(56) References Cited

U.S. PATENT DOCUMENTS

| | | |
|---|---|---|
| 4,834,054 A | 5/1989 | Hashimoto et al. |
| 4,870,942 A | 10/1989 | Shibata et al. |
| 4,975,628 A | 12/1990 | Lemieux |
| 5,072,165 A | 12/1991 | Mimura |
| 5,379,217 A | 1/1995 | Mimura |
| 5,383,126 A | 1/1995 | Takemi |
| 5,508,926 A | 4/1996 | Wade |
| 5,867,092 A * | 2/1999 | Vogt .......................... 200/61.91 |
| 5,937,835 A * | 8/1999 | Turner et al. ........... 123/568.24 |
| 6,070,852 A * | 6/2000 | McDonnell et al. ... 251/129.11 |
| 6,102,016 A * | 9/2000 | Sitar et al. ............. 123/568.23 |
| 6,155,126 A * | 12/2000 | Vogt et al. ..................... 74/335 |

* cited by examiner

Primary Examiner—Gene Mancene
Assistant Examiner—Arnold Castro
(74) Attorney, Agent, or Firm—Brinks Hofer Gilson & Lione (57) ABSTRACT

An integrated electric motor and controller reduces weight and provides improved performance of devices associated with internal combustion engines such as EGR valves, turbocharger wastegates and the like. The integrated motor and controller includes an electric motor having an output shaft driving a first segmented wheel and adjacent sensor which provide signals regarding the rotation and direction of rotation of the motor output. The motor also drives a gear train having an output member which bi-directionally either rotates or translates linearly. A position coding feature is disposed on the output member and adjacent sensors provide signals regarding the position of the output member. The sensors drive a microcontroller which in turn drives the electric motor. The sensors, the electric motor, the gear train and the microcontroller are all disposed within a common housing.

20 Claims, 9 Drawing Sheets

INTEGRATED MOTOR AND CONTROLLER FOR TURBOCHARGERS, EGR VALVES AND THE LIKE

BACKGROUND OF THE INVENTION

The invention relates generally to devices for controlling EGR valves and turbochargers and more specifically to an integrated unit having an electric motor and electronic controller disposed in a housing and having a moving output member capable of positioning a control device in an exhaust gas recirculation (EGR) valve, a turbocharger or similar component.

Positioning of control devices in ancillary internal combustion engine components such as EGR valves and turbochargers may be accomplished by many classes and types of actuators. A frequently utilized actuator for EGR valves in passenger vehicles is a vacuum actuator driven by manifold vacuum. While the magnitude of the manifold vacuum provides a reasonably accurate driving signal to the EGR valve which opens or closes in proportion thereto, this system today may be characterized as primitive. Once the operating parameters such as endpoints and gain are established, the operational characteristics of the EGR valve are essentially fixed. They cannot accommodate, for example, other infrequently encountered operating conditions which might require a unique response.

A second consideration which encourages simplicity of operator design is the operating environment. Not only are such actuators disposed in the engine compartment and exposed to high operating temperatures but also they are mounted on or near the exhaust manifold which further raises operating temperatures.

Furthermore, the vacuum actuator is sized to provide reasonable operating force. However, the operating environment of EGR valves is such that they are susceptible to accumulation of carbon deposits which may significantly increase operating force. Large deposits generally render them inoperable. Given such simple mechanical operators, there has typically been no way to free the valve and there existed no feedback or signal to any associated device indicating the inoperable state.

A similar situation exists with regard to control devices associated with turbochargers. Once again, the operating environment of turbochargers, situated as they are in communication with the exhaust gases of the engine, are inhospitable. Accordingly then, controls for such devices are often simplified to improve reliability. Such simplification, however, compromises performance.

Another problem which also relates to the operating environment involves the interconnections between sensors, a controller and the actuator. The electric drive motor of the actuator may be mounted adjacent, for example, a throttle body fuel injection device and coupled to the control member by a linkage. Sensors provide information through cables and connectors to a remotely mounted controller which provides a drive signal to the electric motor, again through cables and connectors. The separation of these components and their interconnection through cables and connectors, may be the source of operating anomalies and failures.

The invention herein disclosed and claimed addresses these and many other design issues.

SUMMARY OF THE INVENTION

An integrated controller for EGR valves, turbochargers and the like includes an electric motor and controller in a common housing. The motor includes an output shaft having a segmented wheel and adjacent sensor which provide signals regarding the rotation and direction of rotation of the motor. The motor also drives a gear train having an output member which is coupled to and moves a control member such as a valve member in an EGR valve or turbocharger wastegate. A position coding feature is disposed on the output member and adjacent sensors provide signals regarding the position of the output member. The sensors drive a microcontroller which in turn drives the motor. The microcontroller also receives position commands or instructions from an external source. Preferably, the sensors, the drive motor, the gear train and the microcontroller are all disposed in a common housing.

It is thus an object of the present invention to provide an integrated motor and electronic controller which senses and positions a control member.

It is a further object of the present invention to provide a motor and electronic controller which are contained within a common housing.

It is a still further object of the present invention to provide a motor and controller which reduces the number of external wiring harnesses and electrical connectors relative to previous designs.

It is a still further object of the present invention to provide a motor and controller having sensing assemblies associated with both the motor and gear train outputs.

Further objects and advantages of the present invention will become apparent by reference to the following description of the preferred embodiment and appended drawings wherein like reference numbers refer to the same component, element or feature.

DESCRIPTION OF THE PREFERRED AND ALTERNATE EMBODIMENTS

Figure 1:
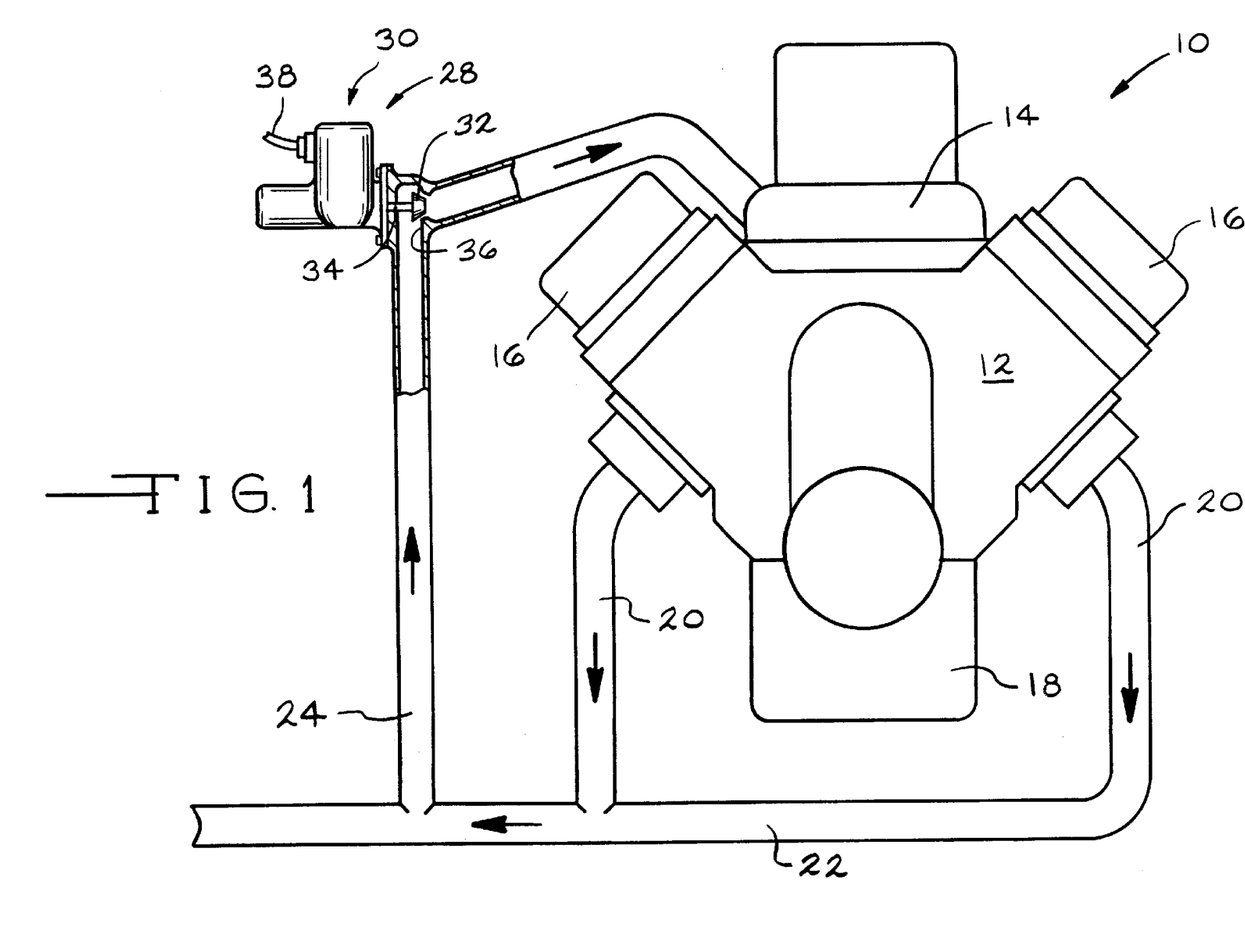
FIG. 1 is a diagrammatic view of an internal combustion engine having an EGR valve operated by a linear output, integrated motor and controller assembly according to the present invention.

Referring now to FIG. 1, an internal combustion engine is illustrated and generally designated by the reference number 10. The internal combustion engine 10 is conventional and includes an engine block 12 upon which are mounted an inlet manifold 14, valve covers 16, an oil pan 18 and exhaust manifolds 20. The exhaust manifolds 20 feed into an exhaust pipe 22 which branches and communicates with an exhaust recirculation line 24. It will be appreciated that the engine 10 illustrated as well as the specific construction of the exhaust manifolds 20 and the exhaust pipe 22 are by way of example and illustration only and are intended to generally represent the typical multiple cylinder, internal combustion engine environment of the present invention.

The exhaust recirculation line 24 is in fluid communication with the inlet manifold 14. An exhaust gas recirculation (EGR) valve assembly 28 is disposed in the exhaust recirculation line 24. The exhaust gas recirculation valve assembly 28 includes a linear output, integrated motor and controller assembly 30 which drives and positions a valve plunger 32 located in the exhaust gas recirculation line 24. The valve plunger 32 of the exhaust gas recirculation valve assembly 28 is mounted upon an axially, bi-directionally moveable valve stem 34. Accordingly, as the valve stem 34 translates, the valve plunger 32 moves between a fully opened position as illustrated in FIG. 1 and a fully closed position with the valve plunger 32 in contact with a valve seat 36. The integrated motor and controller assembly 30 receives control signals and operating voltage through an electrical cable 38. Sensors utilized to create such control signals may be disposed on the engine block 12, the inlet manifold 14 or a throttle to detect such conditions as engine temperature, manifold vacuum, throttle position or any other variable, condition or signal to provide information and control the integrated motor and controller assembly 30.

Figure 2:
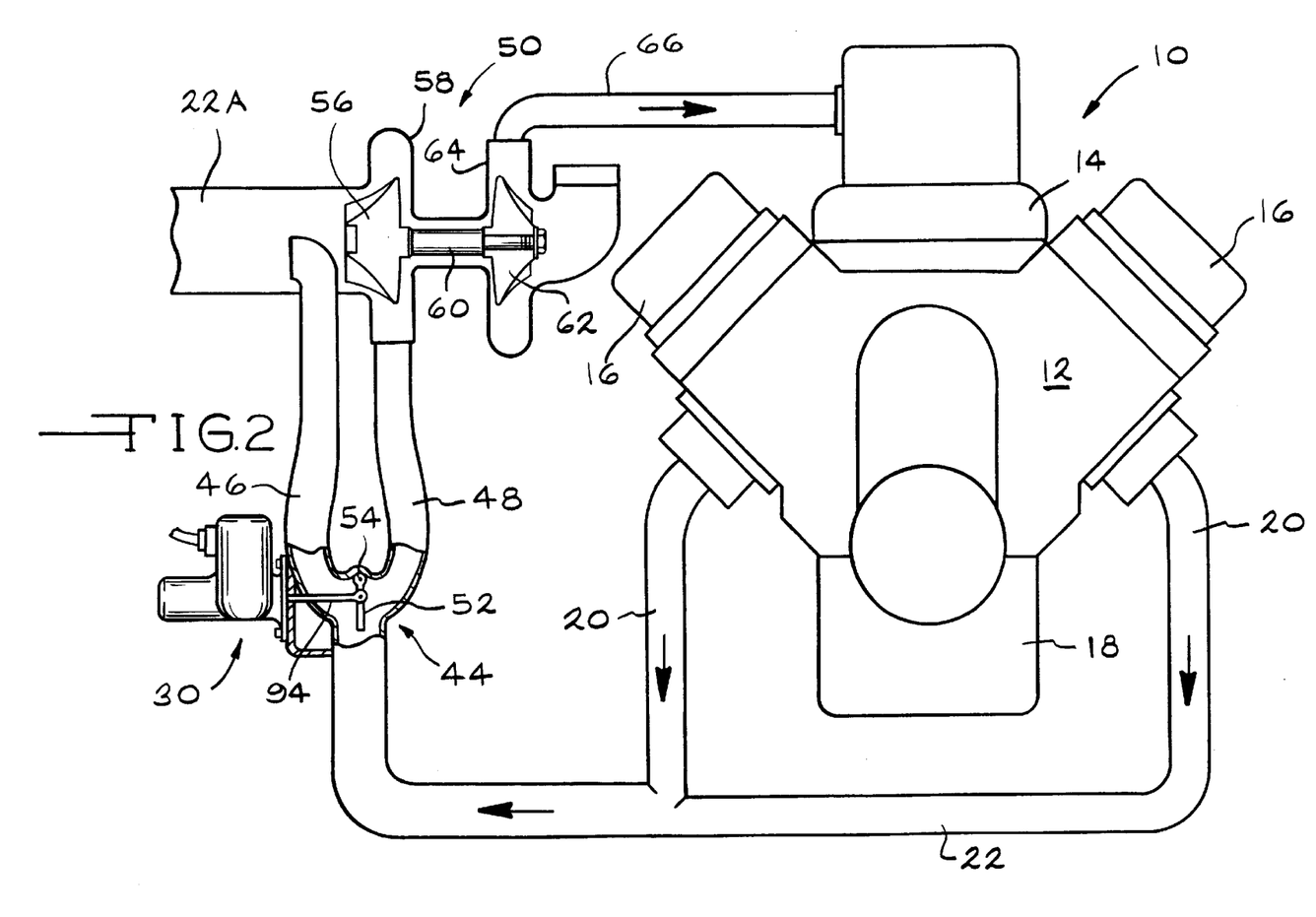
FIG. 2 is a diagrammatic view of an internal combustion engine having a turbocharger wastegate (bypass) valve operated by a linear output, integrated motor and controller assembly according to the present invention.

Referring now to FIG. 2, another application for the linear output, integrated motor and controller assembly 30 is illustrated. Once again, a conventional internal combustion engine 10 includes the engine block 12, the inlet manifold 14, the valve covers 16, the oil pan 18 and the exhaust manifolds 20 which communicate with the exhaust pipe 22. Again, the internal combustion engine 10 is presented as illustrative and exemplary of multiple cylinder internal combustion engines utilized in motor vehicles. Disposed in the exhaust pipe 22 is a bypass valve or wastegate assembly 44 which directs or diverts a stream of exhaust gases to either a first bypass pipe or line 46 which leads directly to an additional exhaust pipe 22A or to a second active pipe or line 48 which leads to a turbocharger assembly 50.

At the junction of the exhaust pipe 22, the bypass line 46 and the active line 48 is a diverter or paddle valve member 52. The diverter or paddle valve member 52 is disposed upon a stub shaft 54 and is pivotally linked to the output of the motor and controller assembly 30. Translation of the output of the integrated motor and controller assembly 30 directs exhaust flow from the exhaust pipe 22 to either the bypass line 46 or the active line 48 and thence to the turbocharger assembly 50.

The turbocharger assembly 50 is representative and illustrative of a broad class of devices having a first (exhaust) turbine 56 disposed in a suitably configured housing 58 which is acted upon and rotated by the exhaust gases impinging upon it from the active line 48. The first (exhaust) turbine 56 is connected through a shaft 60 disposed on suitable bearings to a second (air) turbine 62 which is also disposed in a suitable housing 64. Air moved and compressed by the second turbine 62 exits the housing 64 through an air outlet line 66 and is provided to the inlet manifold 14. It will be appreciated that the turbocharger assembly 50 illustrated is intended to generally represent devices of this nature utilized with internal combustion engines 10.

Figure 3:
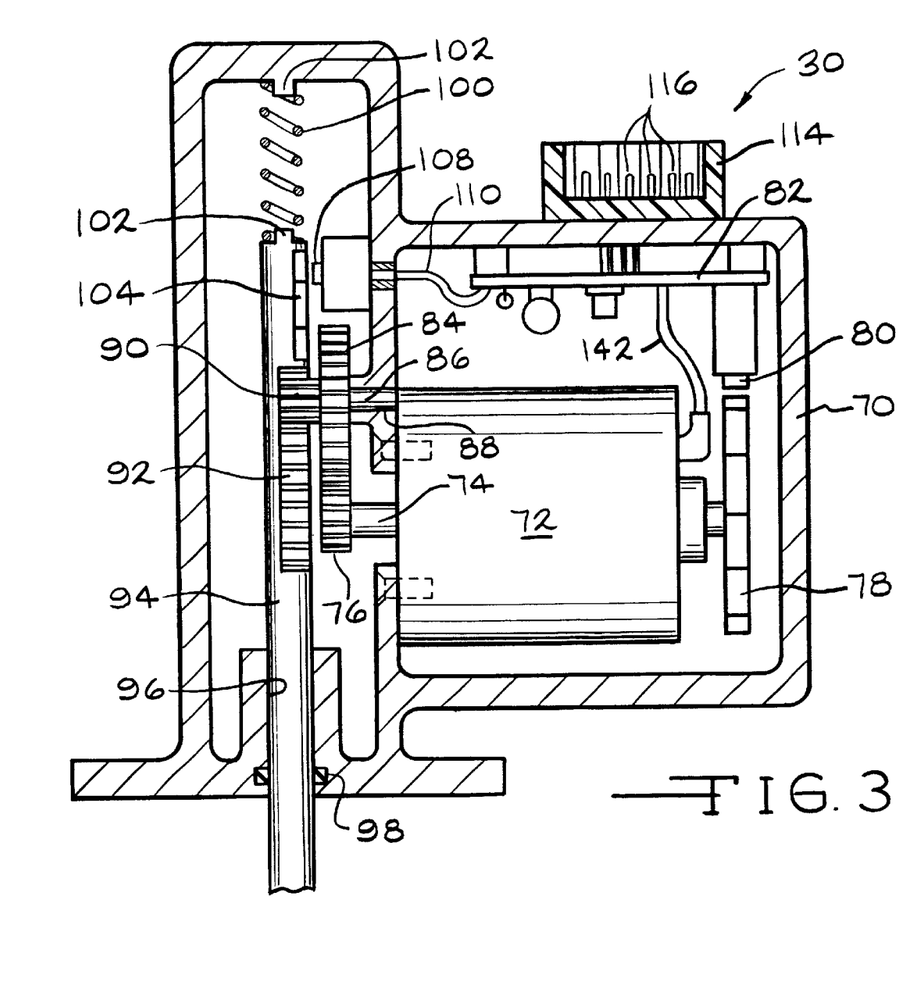
FIG. 3 is an enlarged, sectional view of a linear output, integrated motor and controller assembly according to the present invention.

Referring now to FIG. 3, the position of the valve plunger 32 of the EGR valve assembly 28 or the paddle valve member 52 of the wastegate assembly 44 is commanded by the integrated motor and controller assembly 30. The integrated motor and controller assembly 30 includes a two-piece housing 70. The two-piece housing 70 includes various openings and counterbores which receive components of the integrated shift control assembly 30 and protects such components as well. A gasket (not illustrated) may be utilized to provide a seal between the pieces of the housing 70. Preferably, the housing 70 is die cast of aluminum or other suitable strong and relatively lightweight material.

Figure 4:
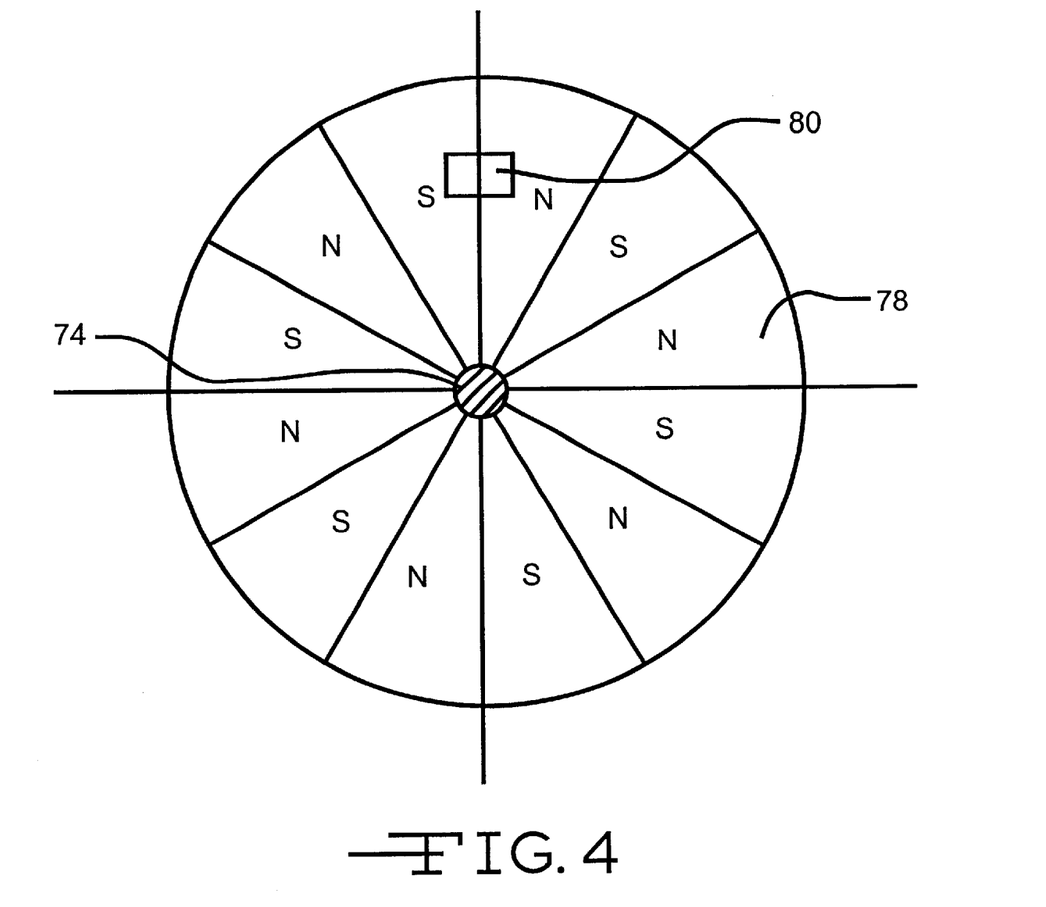
FIG. 4 is an enlarged, plan view of a magnet ring on a drive motor shaft of a linear output, integrated motor and controller assembly according to the present invention.

Mounted within the housing 70 is a bi-directional electric drive motor 72 having an output shaft 74 coupled to a first drive pinion 76. Also secured to and rotating with the output shaft 74 at the opposite end of the drive motor 72 is a segmented magnet wheel 78. As illustrated in FIG. 4, the magnet wheel 78 is preferably divided into twelve segments of alternating, e.g., N-S-N-S, etc., magnetic poles, each occupying an arc of 30°. As the magnet wheel 78 rotates, an adjacent pulse counting and rotation sensing first Hall effect sensor 80 detects changes in the magnetic polarity and provides output signals indicating both rotation and the direction of rotation. The speed of rotation of the output shaft 74 may also be deduced from the pulse count and provided as a separate signal or subsequently computed, as desired. With a magnet wheel 78 having twelve segments, twelve pulses per revolution are generated. The first Hall effect sensor 80 may be a Model 3422 Hall effect sensor manufactured by Allegro Micro Systems, Inc., Worcester, Mass. or functionally similar device such as optical or variable reluctance sensors paired with a suitably configured segmented wheel 78. The first Hall effect sensor 80 is mounted upon a printed circuit board 82 to which a plurality of electrical connections, for electrical power, ground and speed and direction signals are made.

The first drive pinion 76 is in constant mesh with the teeth of a spur gear 84 which is received upon a stub shaft 86 which seats within a suitably disposed blind aperture 88 formed in the housing 70. The spur gear 84 is coupled to or integrally formed with a second pinion gear 90 which engages a gear rack 92 formed in or on a linear output member 94. The linear output member 94 is coupled to or forms a portion of the valve stem 34. The linear output member 94 is received with a complementarily sized elongate bearing or bushing 96 formed in the housing 70. An O-ring seal 98 inhibits the entry of foreign material into the housing 70 about the output member 94. A compression spring 100 which may be positioned and retained on lugs 102 formed in the housing 70 and the output member 94 provides a force which biases the output member 94 into its advanced or extended position.

Between the gear rack 92 and adjacent the end of the output member 94 within the housing 70 is a region of bar magnets 104 having a plurality of alternating North and South poles extending longitudinally along the output member 94. Disposed in adjacent, sensing relationship with the bar magnets 104 is a calibration and position sensing second Hall effect sensor 108. The second Hall effect sensor 108 may be a Model 3280 manufactured by Allegro Micro Systems, Inc., Worcester, Mass. As noted previously, other sensors such as variable reluctance sensors or optical sensors with an appropriate substitution of optically readable features for the bar magnets 104 are also suitable. A plurality of electrical conductors 110 extend from the second Hall effect sensor 108 to the printed circuit board 82. An electrical connector housing 114 is sealingly secured to the housing 70 and includes a plurality of electrical terminals 116 which connect the printed circuit board 82 to an external device or devices.

Figure 5:
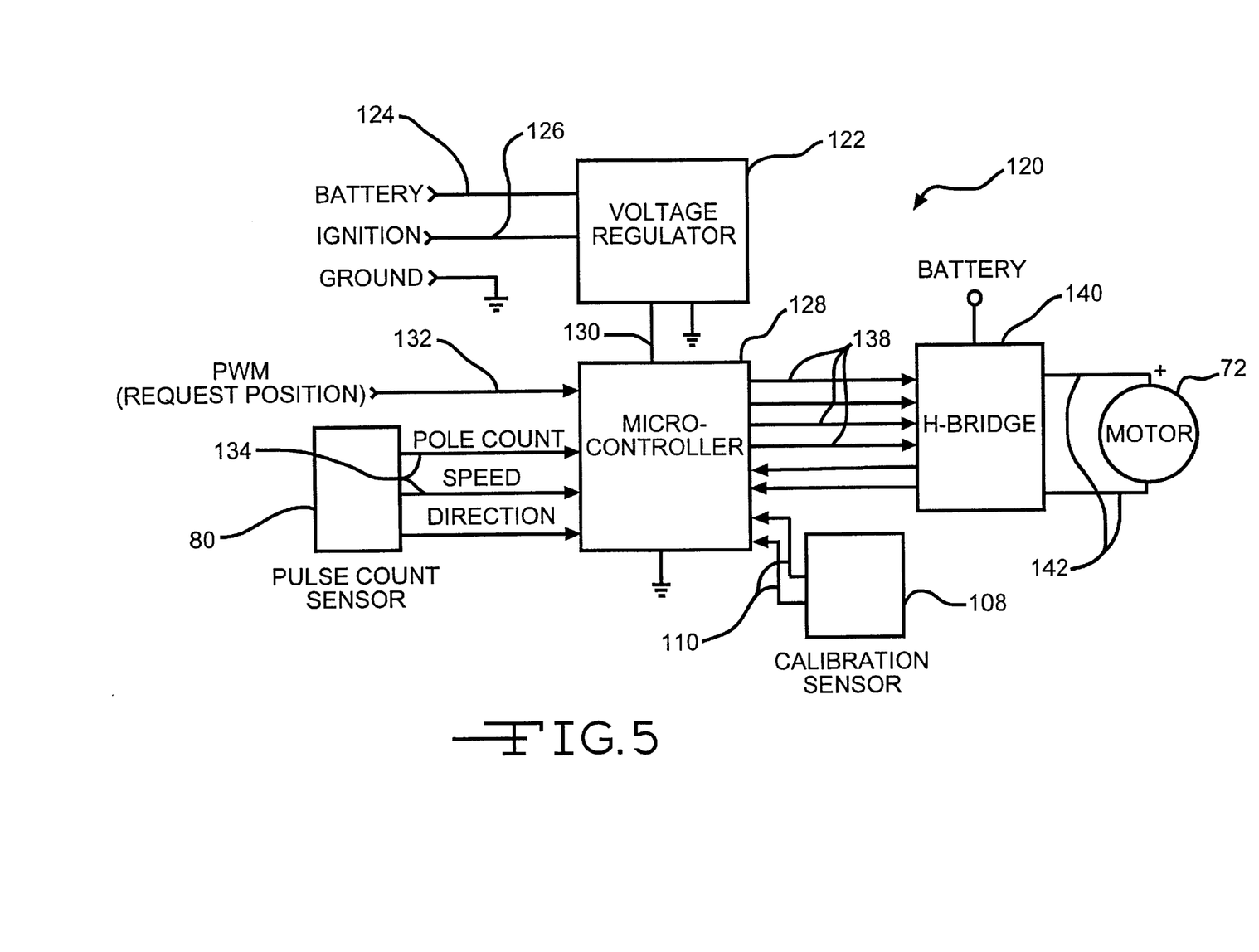
FIG. 5 is a schematic block diagram of an electronic circuit for an integrated motor and controller assembly according to the present invention.

Referring now to FIG. 5, a schematic diagram of the control circuitry 120 which may be disposed on the printed circuit board 82 mounted in the housing 70 of an integrated motor and controller assembly 30 according to the present invention is illustrated. The control circuitry 120 includes a voltage regulator 122 which constantly receives battery voltage from a vehicle battery (not illustrated) in a line 124 and an ignition signal in a line 126 when the ignition of the vehicle is activated. When the ignition is activated, regulated electrical power is provided to a microcontroller 128 in an electrical line 130. A control line 132 provides a signal to the microcontroller 128 which requests or commands movement of the controlled device (the EGR valve assembly 28 or the wastegate assembly 44) to a desired new position. Preferably, the signal in the control line 132 will be a pulse width modulated (PWM) signal or similar modulating control signal which ultimately drives the electric motor 72 to a desired modulated or proportional position.

The first Hall effect sensor 80 provides signals to the microcontroller 128 representative of rotation and direction of the segmented magnet wheel 78 and thus the motor 72 through a plurality of lines 134. The second Hall effect sensor 108 likewise provides signals representative of the location of the output member 94 in the lines 110. Given the data from the first Hall effect sensor 80 and the second Hall effect sensor 108, the microcontroller 128 compares the data regarding the present position of the output member 94 with that requested or appearing in the input signal line 132. A difference between the requested and current position of the output member 94 causes the microcontroller 128 to generate positioning signals in a plurality of lines 138 which drive a H-bridge device 140 which provides appropriate polarity and energizes and de-energizes the motor 72 through the lines 142 to effect the repositioning thereof requested in the control line 132.

Figure 6:
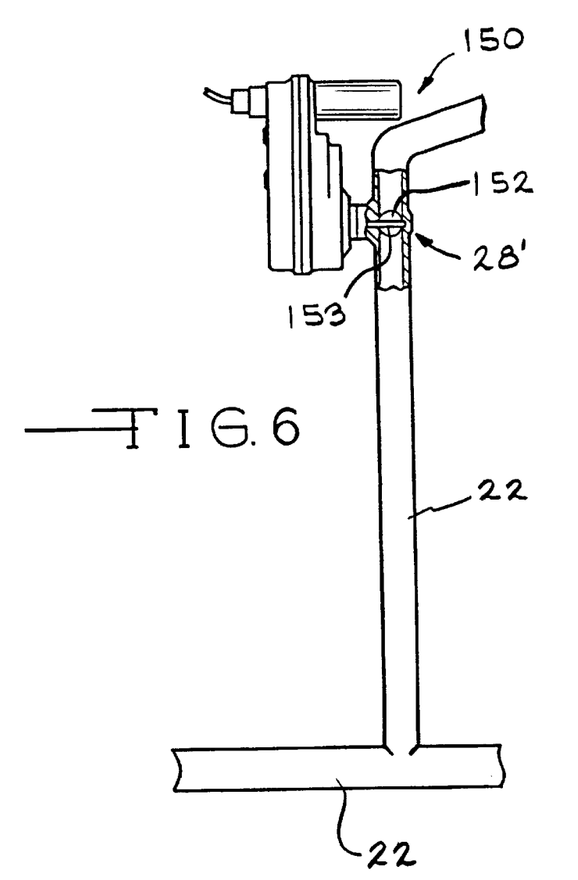
FIG. 6 is a fragmentary, diagrammatic view of an exhaust system having an EGR valve operated by a rotary output, integrated motor and controller assembly according to the present invention.

Referring now to FIG. 6, a first alternate embodiment rotary output, integrated motor and controller assembly utilized with an EGR valve is illustrated and designated by the reference number 150. The first alternate embodiment rotary output, integrated motor and controller assembly 150 is utilized with the internal combustion engine 10 having the components described above with reference to FIG. 1, particularly the exhaust pipe 22 and the exhaust circulation line 24. The rotary output, integrated motor and controller assembly 150 bi-directionally rotates and positions a butterfly or disc valve 152 mounted on a shaft 153 of an exhaust gas recirculation valve 281 disposed in the exhaust recirculation line 24.

Figure 7:
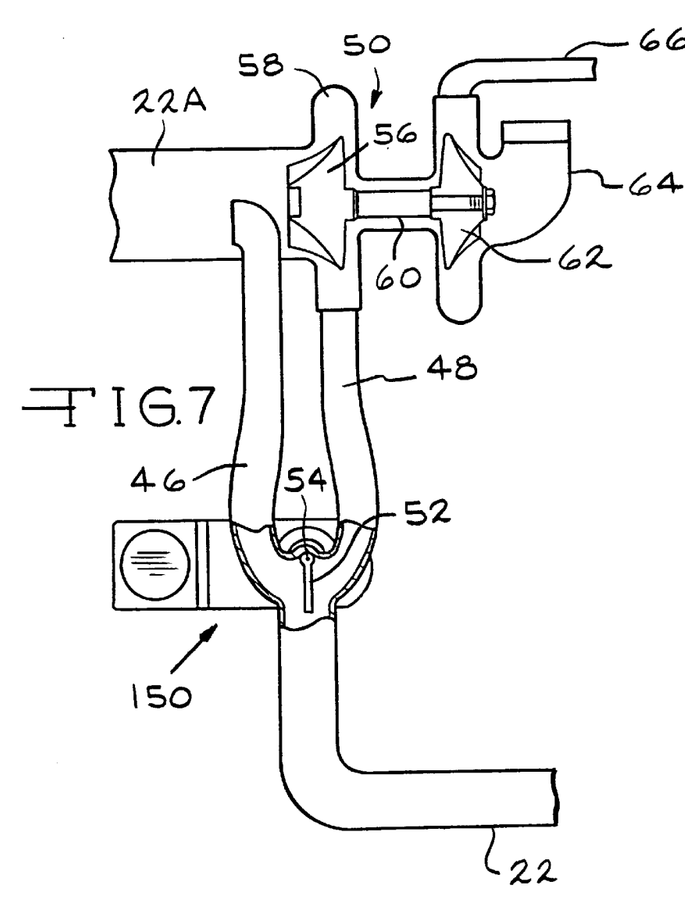
FIG. 7 is a fragmentary, diagrammatic view of an exhaust system having a turbocharger wastegate (bypass) valve operated by a rotary output, integrated motor and controller assembly according to the present invention.

As illustrated in FIG. 7, a rotary output, integrated motor and controller assembly 150 may also be utilized to position a control member such as a flow diverter or paddle 52 mounted upon a stub shaft 54 of a turbocharger wastegate assembly 44. Again, the rotary output, integrated motor and controller assembly 150 is utilized with an internal combustion engine 10 having the components described above with reference to FIG. 2. The diverter or paddle member 52 directs exhaust flow between a first bypass pipe or line 46 and a second active pipe or line 48 which is in fluid communication with the turbocharger assembly 50 having the first (exhaust) turbine 56, the housing 58, the shaft 60, the second (air) turbine 62, the second housing 64 and the air outlet line 66.

Figure 8:
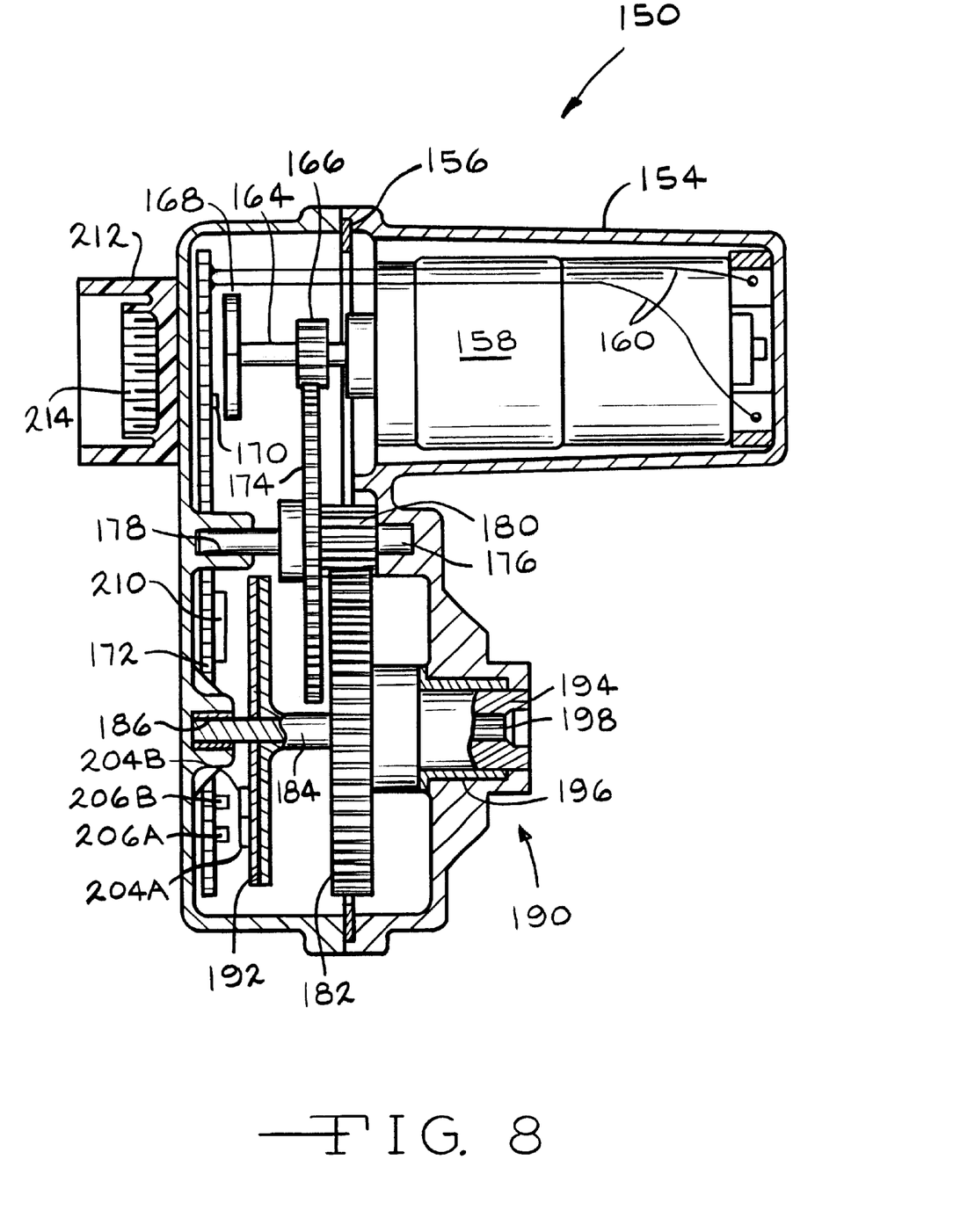
FIG. 8 is an enlarged, sectional view of a rotary output, integrated motor and controller assembly accordingly to the present invention.
Figure 9:
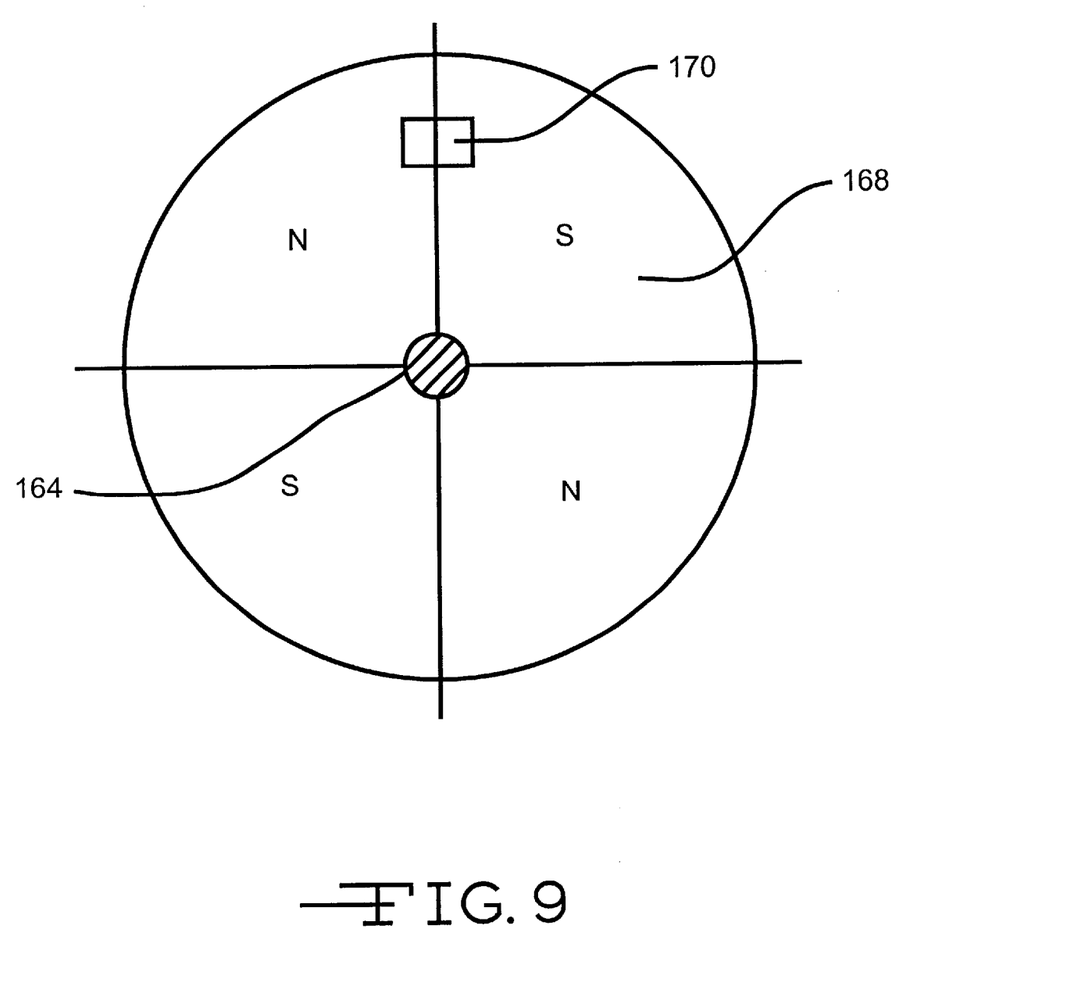
FIG. 9 is an enlarged, plan view of a magnet ring on a drive motor shaft of a rotary output, integrated motor and controller assembly according to the present invention.

Referring now to FIGS. 8 and 9, the rotary output, integrated motor and controller assembly 150 includes a two-piece housing 154 which includes various openings and bores which receive components of the integrated motor and control assembly 150 and protect such components as well. An elastomeric gasket 156 ensures a suitable seal between the components of the two-piece housing 154. Preferably, the housing 154 is die cast of aluminum or other suitable strong and relatively lightweight material. Mounted within the housing 154 is an electric drive motor 158 having electrical leads 160. The electric drive motor 158 drives an output shaft 164 coupled to a first drive pinion 166. Also secured to and rotating with the output shaft 164 and the first drive pinion 164 is a segmented magnet wheel 168. The segmented wheel 168 is preferably divided into four quadrants having alternating magnetic poles, each occupying an arc of 90 degrees. As the segmented wheel 168 rotates, an adjacent first Hall effect sensor 170 detects changes in the magnetic polarity and provides output signals indicating both rotation and direction of rotation. The first Hall effect sensor 170 is mounted upon a printed circuit board 172 disposed within the housing 154. With a segmented magnet wheel 168 having four quadrants, four pulses per revolution are generated. The first Hall effect sensor 170 may be an Allegro Model 3422 Hall effect sensor or functionally similar device such as optical or variable reluctance sensors.

The first drive pinion 166 is in constant mesh with the teeth of a first spur gear 174 which is received upon a stub shaft 176 which seats within suitably aligned bores 178 formed in the housing 154. The first spur gear 174 is coupled to or integrally formed with a second pinion gear 180 which provides a second speed reduction with a second spur gear 182. Similarly, the second spur gear 182 is secured to a stub shaft 184 which is received within a suitable friction reducing bushing 186 mounted in the housing 154.

The second spur gear 182 is fixedly secured to an output shaft assembly 190 and rotates therewith. The output shaft assembly 190 includes a circular disc or plate 192 secured to or integrally formed with the stub shaft 184. On the opposite side of the second spur gear 182 is an output member 194 which is received within a friction reducing sleeve 196. The output member 194 defines a splined bore 198 which receives and drives a complementarily configured component such as the shaft 153 of the EGR valve assembly 281 or the stub shaft 54 of the wastegate assembly 44.

Figure 10:
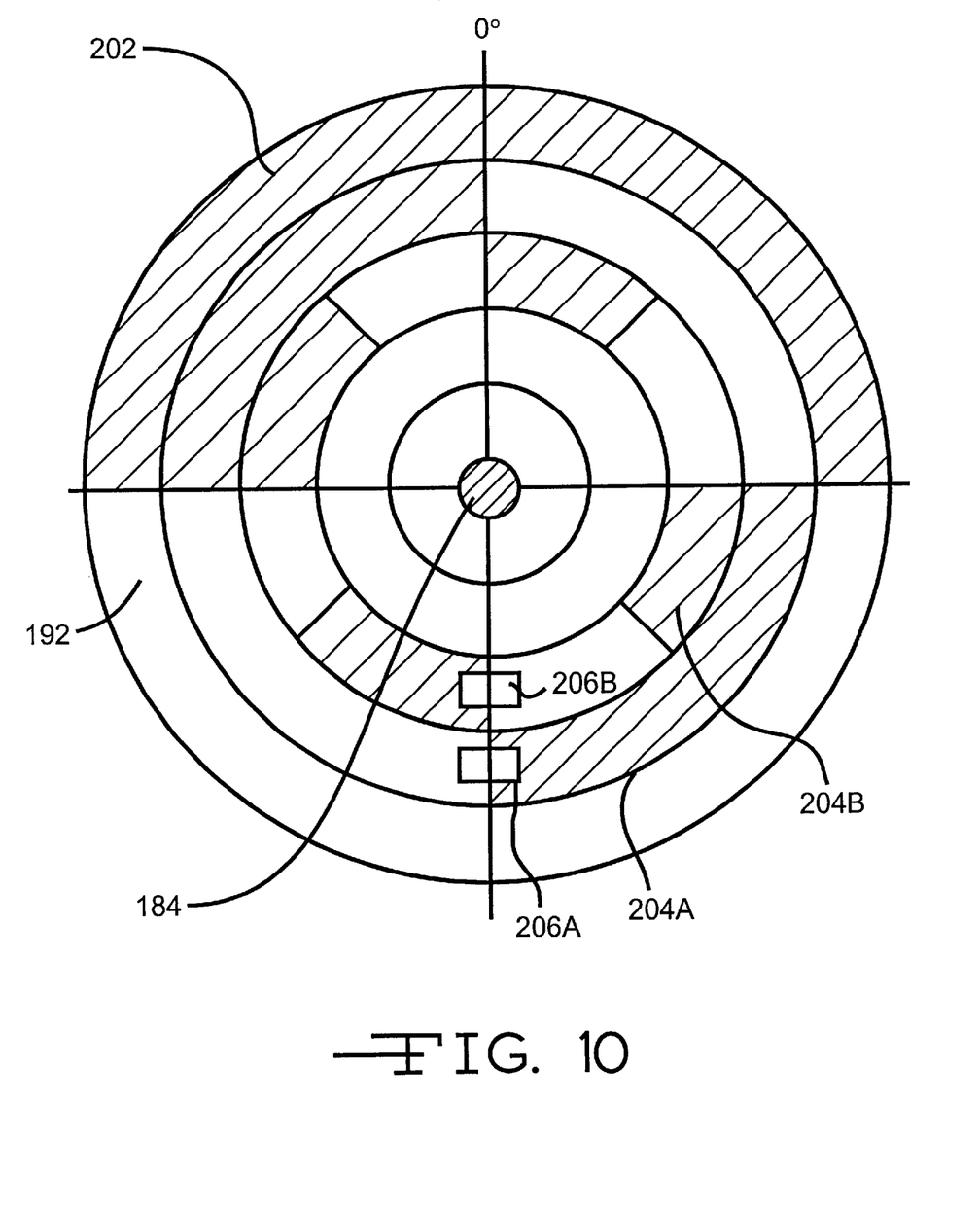
FIG. 10 is an enlarged, plan view of a rotary position encoding assembly of a rotary output, integrated motor and controller assembly according to the present invention.

Referring now to FIG. 10, the circular plate 192 includes an array of curved magnetic regions 202 disposed in tracks 204A and 204B, in a configuration which is analogous to and generates Gray code data as the circular plate 192 rotates past a plurality, preferably two, non-contact sensors 206A and 206B. One of the sensors 206A and 206B aligns with a respective one of the tracks 204A and 204B of the magnetic regions 202 in the circular plate 192. The sensors 206A and 206B are preferably Hall effect sensors although other types of sensors such as optical or variable reluctance sensors may be utilized. The magnetic regions 202 interact with the Hall effect sensors 206A and 206B. However, the circular plate 192 may be made of other materials or contain apertures which appropriately interact with the specific type of sensors 206A and 206B utilized.

The segmented magnet wheel 168 and the circular plate 192 cooperate to provide highly accurate position information to a microcontroller 210 which is disposed upon the printed circuit board 172 within the housing 154. That is, the Gray code configuration of the circular plate 192 provides a positive indication of four angular regions each extending over 45 degrees. These four regions are positively identified by the two Hall effect sensors 206A and 206B. At the same time, the segmented wheel 168 and the first sensor 170 provide a pulse every ninety degrees of rotation (four pulses per revolution) to the microcontroller 210 which allows it to not only determine the current activity of the drive motor 158, i.e., operation and direction, but also to compute the position of the output shaft 184 and the output member 194. This is possible, of course, because the gear train assembly provides a fixed, known and repeated position and speed reduction between the output shaft 164 of the drive motor 158 and the stub (output) shaft 184 of the rotary output, integrated motor and controller assembly 150. Thus the pulses from the first Hall effect sensor 170 generated by rotation of the segmented wheel 168 can be counted to determine the position of the circular plate 192 where the coded signals from the Hall effect sensors 206A and 206B do not provide position information with sufficient definition. For example, from a known starting position, the position of the stub (output) shaft 184 can be computed by dividing the number of pulses from the sensor 170 by four times the gear ratio between the electric motor 158 and the stub shaft 184.

Depending upon the definition necessary, that is, how many unique detected and coded positions of the circular plate 192 are necessary as well as the logic and operating capabilities of the microcontroller 210 and its software, a circular plate 192 having three tracks and three sensors or four tracks and four sensors may also be utilized. The circuitry on the printed circuit board 172 utilized in the rotary output, integrated motor and controller assembly 150 is preferably like or similar to the control circuitry 120 on the printed circuit board 82 illustrated and described above with reference to FIG. 5 and the linear output, integrated motor and controller assembly 30.

The circuit board 172, as noted, is fully contained within the housing 154 of the rotary output, integrated motor and controller assembly 150. As such, it is protected from ambient conditions by the relatively rugged housing 154 which contains and locates the mechanical components of the assembly 150. The sensors 170, 206A and 206B are mounted proximate the circuit board 172 and many other electronic and semi-conductor devices such as the microcontroller 210 are mounted directly thereto. The electrical leads 160 connect the drive motor 158 to appropriate locations on the printed circuit board 172. A connector housing 212 is sealingly secured to the housing 154 and includes a plurality of electrical terminals 214 which provide electrical energy and various control signals to the microcontroller 210 and ultimately to the motor 158.

It will be appreciated that the disposition of the microcontroller 210 and associated electronic devices within the housing 154 of the rotary output, integrated motor and controller assembly 150 not only shortens many electrical leads such as those leads 160 from the printed circuit board 172 to the electric motor 158 but also minimizes the number of electrical terminals 214 and associated wiring to the printed circuit board 172 which must pass through the housing 154. The foregoing features and benefits, of course, apply with equal force to the linear output, integrated motor and controller assembly 30 described above.

It will also be appreciated that while the foregoing linear output and rotary output, integrated motor and controller assemblies 30 and 150 have been described in conjunction with EGR valves and turbocharger wastegates, they are suitable for controlling other devices in the various systems of motor vehicle internal combustion engines.

The foregoing disclosure is the best mode devised by the inventor for practicing this invention. It is apparent, however, that apparatus incorporating modifications and variations will be obvious to one skilled in the art of motor driven control mechanisms. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. An integrated motor and controller assembly for an EGR valve or turbocharger wastegate comprising, in combination,
   a housing,
   a drive motor disposed in said housing and having an output,
   a segmented wheel disposed for rotation on said output of said electric drive motor,
   a first sensor disposed in sensing relationship with said segmented wheel,
   a gear train disposed in said housing, operably coupled to said output of said drive motor and having an output member,
   a position assembly disposed for motion with said output member, said position assembly defining a plurality of distinct signal generating regions,
   at least one sensor disposed in sensing relationship with said position assembly, and
   a microcontroller operably coupled to said sensors and operably driving said drive motor.

2. An integrated motor and controller assembly for use with a feature of an internal combustion engine comprising, in combination,
   a housing,
   an electric drive motor disposed in said housing and having an output,
   a rotation sensing assembly on said output of said electric drive motor,
   a gear train disposed in said housing, operably coupled to said output of said drive motor and having an output member,
   a sensed assembly disposed for movement with said output member, said sensed assembly defining a plurality of distinctly sensed regions,
   at least one sensor disposed in sensing relationship with said sensed array, and
   a microcontroller operably coupled to said sensing assembly and said at least one sensor.

3. The integrated controller assembly of claim 1 wherein said output member rotates and said position assembly is disposed in an arcuate array.

4. The integrated controller assembly of claim 1 wherein said output member translates linearly and said position assembly is disposed linearly.

5. The integrated controller assembly of claim 1 wherein said first sensor senses both rotation and direction of rotation.

6. The integrated controller assembly of claim 1 wherein said gear train includes a plurality of pinion gears and spur gears which reduce speed and increase torque of said drive motor.

7. The integrated controller assembly of claim 1 wherein further including a multiple conductor connector extending through said housing.

8. An integrated motor and controller assembly for use with a feature of an internal combustion engine comprising, in combination,     a housing,     an electric drive motor disposed in said housing and having an output,     a rotation sensing assembly on said output of said electric drive motor,     a gear train disposed in said housing, operably coupled to said output of said drive motor and having an output member,     a sensed assembly disposed in said housing for movement with said output member, said sensed assembly defining a plurality of distinctly sensed regions,     at least one sensor disposed in sensing relationship with said sensed assembly, and     a microcontroller disposed in said housing and operably coupled to said at least one sensor.

9. The integrated controller assembly of claim 8 wherein said sensing assembly and said at least one sensor include Hall effect sensors.

10. The integrated controller assembly of claim 8 wherein said gear train includes a plurality of pinion gears and spur gears which reduce speed and increase torque of said drive motor.

11. The integrated controller assembly of claim 8 wherein said microcontroller operably-controls said electric drive motor.

12. The integrated controller assembly of claim 8 wherein said output member rotates and said sensed assembly is disposed in an arcuate array.

13. The integrated controller assembly of claim 8 wherein said output member translates linearly and said sensed assembly is disposed linearly.

14. The integrated controller assembly of claim 8 wherein said output member rotates and said sensed assembly includes a plurality of curved paths.

15. An integrated motor and controller assembly for use with a feature of an internal combustion engine comprising, in combination,     a housing,     an electric drive motor disposed in said housing and having an output,     a segmented magnet wheel on said output of said electric drive motor,     a first sensor disposed in sensing relationship with said segmented magnet wheel,     a gear train disposed in said housing, operably coupled to said output of said drive motor and having an output member,     a magnet array disposed in said housing for movement with said output member, said magnet array defining a plurality of magnetically distinct regions,     at least one sensor disposed in sensing relationship with said magnet array, and     a microcontroller disposed in said housing and operably coupled to said at least one sensor and for providing drive signals to said electric drive motor.

16. The integrated controller assembly of claim 15 wherein said sensors are Hall effect sensors.

17. The integrated controller assembly of claim 15 wherein said first sensor associated with said segmented magnet wheel also senses direction of rotation.

18. The integrated controller assembly of claim 15 wherein said gear train includes a plurality of pinion gears and spur gears which reduce speed and increase torque of said drive motor.

19. The integrated controller assembly of claim 15 wherein said output member rotates and said magnet array defines at least two tracks of arcuate regions.

20. The integrated controller assembly of claim 15 wherein said output member translates linearly and said magnet array is linear.

\* \* \* \* \*